United States Patent
Kadhe et al.

(10) Patent No.: US 8,775,860 B2
(45) Date of Patent: Jul. 8, 2014

(54) SYSTEM AND METHOD FOR EXACT REGENERATION OF A FAILED NODE IN A DISTRIBUTED STORAGE SYSTEM

(75) Inventors: Swanand Kadhe, Bangalore (IN); Balaji Janakiram, Bangalore (IN); Mariswamy Girish Chandra, Bangalore (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 386 days.

(21) Appl. No.: 13/185,380

(22) Filed: Jul. 18, 2011

(65) Prior Publication Data

US 2012/0023362 A1 Jan. 26, 2012

(30) Foreign Application Priority Data

Jul. 20, 2010 (IN) .......................... 2064/MUM/2010

(51) Int. Cl.
*G06F 11/00* (2006.01)

(52) U.S. Cl.
USPC .......................... 714/4.11; 714/6.22; 714/6.24

(58) Field of Classification Search
None
See application file for complete search history.

(56) References Cited

U.S. PATENT DOCUMENTS

| | | | | |
|---|---|---|---|---|
| 6,151,685 A | * | 11/2000 | Li et al. | 714/6.1 |
| 7,240,272 B2 | * | 7/2007 | Lee et al. | 714/766 |
| 7,308,602 B2 | * | 12/2007 | Dandrea | 714/6.24 |
| 8,156,368 B2 | * | 4/2012 | Chambliss et al. | 714/6.24 |
| 8,522,125 B1 | * | 8/2013 | Feng et al. | 714/801 |
| 2003/0002499 A1 | * | 1/2003 | Cummings et al. | 370/389 |
| 2008/0222481 A1 | * | 9/2008 | Huang et al. | 714/752 |
| 2010/0083068 A1 | * | 4/2010 | Wylie et al. | 714/752 |
| 2010/0269014 A1 | * | 10/2010 | Kidney | 714/758 |
| 2012/0266044 A1 | * | 10/2012 | Hu et al. | 714/763 |

* cited by examiner

*Primary Examiner* — Christopher McCarthy
(74) *Attorney, Agent, or Firm* — Schmeiser, Olsen & Watts LLP

(57) ABSTRACT

The invention relates to a method and a system for regenerating a failed storage node from one or more storage nodes storing an original file and also reconstructing the said original file. The method involves encoding the file segments using a XOR operation, decoding the encoded file segment using the XOR operation and regenerating the failed node by using the storage nodes which are in active position. The regenerated file segments are further written to a new storage node.

8 Claims, 2 Drawing Sheets

SYSTEM AND METHOD FOR EXACT REGENERATION OF A FAILED NODE IN A DISTRIBUTED STORAGE SYSTEM

CROSS REFERENCE TO RELATED APPLICATION[S]

This application claims priority to Indian Patent Application to Kadhe, et al., serial number 2064/MUM/2010, filed Jul. 20, 2010, the disclosure of which is hereby incorporated entirely herein by reference.

FIELD OF THE INVENTION

The invention relates to a method and a system for regenerating a storage node. More particularly, the invention relates to the method and the system for regenerating a failed storage node from one or more storage node storing an original file in a distributed storage system.

BACKGROUND OF THE INVENTION

In today's world the techniques have become advance in terms of storing data by proposing different models for storing a large amount of data efficiently and economically. In a traditional network storage system, lots of data storage devices are present which includes hard drives, memory card etc. While storing data, reliability is a major concern in large distributed systems. Although replication is the simplest way of achieving reliability, coding based techniques are also been used.

Many such methods and systems for regeneration of failed nodes storing data have been proposed. One such method and system (U.S. patent application Ser. No. 12/326,880) relates to a technology in which data blocks are coded into erasure coded blocks in a two-staged, two-level processing operation. In a first processing stage, original blocks are coded into a first level of output data blocks including one or more parity blocks. In the second stage, the first level blocks are partitioned into groups, and these groups are used to generate a second level of parity blocks. The blocks are maintained among a plurality of storage nodes. Recovery of a failed block is accomplished by accessing only the other data blocks associated with the failed data block's coding group. Although, the technique is capable of regenerating the failed node but it involves additional computational complexity. Also the systematic repair is possible but it is difficult to achieve the exact repair for the redundant nodes.

Therefore, there is need for a system and method to provide an exact regeneration of the storage node by using a few operations which results in reduced computational complexity.

OBJECTS OF THE INVENTION

It is a primary object of the invention to provide, in a distributed storage system, a system and a method which exactly regenerates a failed storage node by using a very few operations.

It is another objective of the invention to provide in a distributed storage system, a system and a method for reconstructing an original file from storage nodes in active position using few computationally efficient XOR operations.

It is yet another objective of the invention to support, in a distributed storage system, partial recovery of the original file when access to only limited number of nodes is possible and that limited storage nodes which are in active position does not allow the reconstruction of the entire original file.

SUMMARY OF THE INVENTION

A method for regenerating a failed storage node from one or more storage nodes storing an original file in a distributed system is disclosed. The method comprises of splitting the original file into a plurality of file segment, wherein the original file is in encoded form, storing a plurality of encoded file segments into the storage nodes. The encoding is performed by using a XOR operation. The method further comprises of reconstructing the file segments from the encoded file segments stored in the storage node using the XOR operation and regenerating the file segments being stored in the failed storage node from the storage nodes in an active position.

A system for regenerating a failed storage node from one or more storage nodes storing the original file in a distributed storage system is disclosed. The system comprises of a processor configured to process the original file by splitting it into a plurality of file segment. The processor further comprises of an encoder for encoding the file segments to obtain a plurality of encoded file segment using the XOR operation and to store the said encoded file segments into the storage nodes, a decoder for reconstructing the file segments from the encoded file segments and a generator for regenerating the file segments stored in the failed storage node from the storage nodes in an active position and writing it to a new storage node.

DETAILED DESCRIPTION OF THE INVENTION

Some embodiments of this invention, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present invention relates to a method for regenerating a failed storage node (9). Particularly, the invention relates to a method for regenerating the failed storage node (9) from one or more storage nodes (5) storing an original file. More particularly the invention relates to the method for reconstructing the original file in a distributed storage system.

Figure 1:
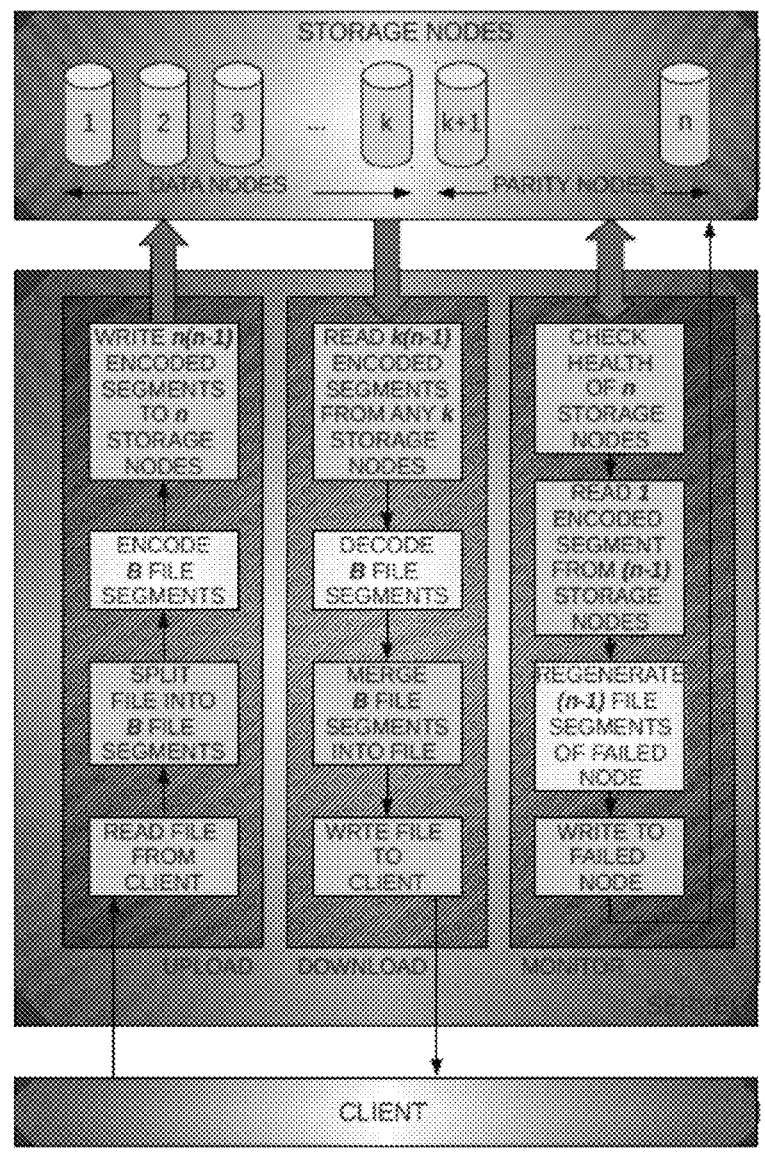
FIG. 1 illustrates the functional representation of the invention in accordance with an embodiment of the invention.

In accordance with an aspect, referring to FIG. 1, the distributed storage system includes a plurality of storage node (5) which may be a module for storing data. These storage nodes (5) are referred to as n. whenever a client makes a request to upload an original file on a server, the original file gets split into a plurality of file segment. These file segments are referred to as B. The original file is in encoded form.

In accordance with an embodiment, the plurality of storage node (5) includes a plurality of data storage node (6) and a plurality of parity node (7). Out of the n storage node (5) in the distributed storage system, the plurality of data storage node (6) is referred to as k and the plurality of parity node (7) is referred to as n–k.

In accordance with an embodiment, the storage nodes (5) include the data storage nodes (6) and the parity nodes (7). The data storage nodes (6) store an unaltered file segment and the parity nodes (7) stores a plurality of unaltered file segments in addition to a symbol obtained through the encoding of the file segment. Each of the storage node stores n–1 file segments.

In accordance with an embodiment, the number of data storage nodes is greater than 2 and the number of parity nodes is 2.

The B file segments of the original file are encoded using a XOR operation to obtain a plurality of encoded file segment. The encoded file segments are further stored into the storage nodes (5). The encoded file segments are referred to as n*(n–1) encoded file segments.

The encoded file segments stored in the storage nodes (5) are further used to reconstruct the file segments by decoding the encoded file segments using the XOR operation.

The file segments stored in the failed storage node (9) are regenerated from one or more storage nodes (5) in an active position. The file segments which are regenerated are further written to a new storage node.

In accordance with an embodiment, the failed storage node (9) includes the data storage node (6) or the parity node (7).

Mathematical Aspect of the Invention

Encoding of the File Segments:

The systematic encoding phase can be described with an example, but not restricted only to the given example:

The total number of storage nodes (5) "n" in a given distributed storage system may be selected from a set of whole numbers and or natural numbers. The number of data storage nodes (6) "k" can similarly be selected from the set containing natural and or whole numbers. The selected numbers for variables "n" and "k" should satisfy the condition under which the quantity or the number of storage nodes (6) selected should be greater than 2, "k>2" and the number of data storage nodes (6) should be equal to total number of storage nodes (5) on the distributed storage system subtracted by 2, "k=n–2".

Consider a file divided into "B" segments "$x_1, x_2, x_3, \ldots x_k, x_{k+1}, \ldots x_B$", where each file segment is a group of bits which can be treated as a symbol in the extension field "$GF(2^l)$", where "l" is the number of bits in the file segment. For the construction of encoding matrix "M" having rows equal to one less than total number of nodes, "n–1" and column equal to total number of storage nodes (5), "n", in the given distributed storage system;

$$M = \begin{bmatrix} R_{(k-1) \times k} & D^T_{k \times (n-k)} \\ D_{(n-k) \times k} & S_{(n-k-1) \times (n-k)} \end{bmatrix}_{(n-1) \times n}.$$

Where, $$R_{(k-1) \times k} = \begin{bmatrix} x_1 & x_2 & \ldots & x_{k-1} & x_k \\ x_k & x_1 & \ldots & x_{k-2} & x_{k-1} \\ \vdots & \vdots & \vdots & \vdots & \vdots \\ x_3 & x_4 & \ldots & x_1 & x_2 \end{bmatrix};$$

$$D_{(n-k) \times k} = \begin{bmatrix} x_{k+1} & x_{k+2} & \ldots & x_{2k-1} & x_{2k} \\ x_{2k+1} & x_{2k+2} & \ldots & x_{B-1} & x_B \end{bmatrix};$$

$$S_{(n-k-1) \times (n-k)} = [s_1 \quad s_1 \quad \ldots \quad s_1].$$

Here the matrix "$R_{(k-1) \times k}$" with "k–1" rows and "k" columns is cyclic matrix and "$s_1 = x_1 \oplus x_2 \oplus x_3 \ldots \oplus x_B$", where the operation "$\oplus$" is carried out using XOR of the individual bits of the file segments.

The contents of the column "j" from the matrix "M" are distributed to storage node (5) $m_j$, where j=1, 2, 3, . . . , n.

Decoding of the Encoded File Segments:

The second phase of Maximum Distance Separable (MDS) decoding uses only XOR operations to reconstruct the "B" file segments from any "k" available storage nodes (5). This phase can be illustrated by way of following example;

Consider the parity nodes (7) "t" that are selected for reconstruction, value of the variable "t" can be selected from a set consisting natural number with maximum limit of "n–k", i.e. 0, 1, 2, 3, 4 . . . , n–k. The above condition implies that the data storage nodes (6) selected are "k–t". Being a systematic encoding, all the "B" file segments of the original file will be present in the "k" data storage nodes (6). Therefore, when value of variable "t" is zero, all the "k" data storage nodes (6) are selected and file can be directly decoded. For the value of variable "t" greater than Zero, each parity node (7) stores "k" file segments and XOR sum "$s_1$".

The number of file segments obtained from the parity nodes (7) "$N_P$" will be given by, $$N_P = t \times k$$

Number of file segments obtained from the data storage nodes (6) $N_D$, will be given by, $$N_D = (n-k-t) \times (k-t) + k$$

The total number of file segments "T" obtained would be summation of the file segments obtained from the parity nodes (7) "$N_P$" and the data storage nodes (6) "$N_D$"

$$T = N_P + N_D$$

$$T = (t \times k) + (n-k-t) \times (k-t) + k$$

$$T = B - y$$

To complete the reconstruction of "B" file segments, "y" file segments will be obtained from XOR sum "$s_1$". The equation mentioned is possible if the maximum value of variable for file segment "y" is One.

The maximum value of file segments "y" is one can be illustrated as follows;

The file segments "y" is a function of number of parity nodes (7) participating in reconstruction "t". According to standard calculus rules, the first derivative of given equation is zero at maximum or minimum value.

Now, $y = f(t) = t(n-k-t)$ $$\frac{dy}{dt} = (n-k-t) + t(-1) = n-k-2t = 0$$

The second derivative of the said equation should be negative for the value of the file segments "y" to be maximum.

$$\frac{d^2 y}{dt^2} = -2 < 0$$

Therefore the equation for file segments "y" to be maximum—

$$t_{max} = \frac{n-k}{2}$$

$$y_{max} = t_{max}(n-k-t_{max}) = \left(\frac{n-k}{2}\right)\left[(n-k) - \left(\frac{n-k}{2}\right)\right] = \left[\frac{n-k}{2}\right]^2$$

Since "n−k" equals two, "$y_{max}$" equals one, and thus, "B" file segments can be reconstructed.

Exact Regeneration of the Failed Node:

The third phase of exact regeneration is illustrated as follows:

When the storage node (5) $m_j$ fails, the "(n−1)" file segments of that storage node (5) can be exactly regenerated by getting a corresponding file segment from each of the remaining "n−1" nodes. The failed storage node (9) can be the data storage node (6) or the parity node (7). These cases are exemplified as below:

Case 1: Failed node is the parity node (7) represented by "$m_j$".

From code construction, the encoding matrix "M" is given by;

$$M = \begin{bmatrix} R_{(k-1)\times k} & D^T_{k\times(n-k)} \\ D_{(n-k)\times k} & S_{(n-k-1)\times(n-k)} \end{bmatrix}_{(n-1)\times n}$$

When the parity node (7) fails, the file segments comprising columns of matrices $D_{k\times(n-k)}^T$ and $S_{(n-k-1)\times(n-k)}$ are lost. As the column represented by $D_{k\times(n-k)}^T$ correspond to a row of elements in the matrix $D_{(n-k)\times k}$, the "k" file segments are regenerated by downloading the corresponding file segments from all the "k" data storage nodes (6). Due to the initial condition of "n−k=2", $s_1$ is obtained from the remaining parity node (7) available.

Case 2: when the Failed storage node (9) $m_j$ is the data storage node (6).

From code construction, the encoding matrix "M" is given by;

$$M = \begin{bmatrix} R_{(k-1)\times k} & D^T_{k\times(n-k)} \\ D_{(n-k)\times k} & S_{(n-k-1)\times(n-k)} \end{bmatrix}_{(n-1)\times n}$$

When the data storage node (6) fails, the file segments forming columns of matrices $R_{(k-1)\times k}$ and $D_{(n-k)\times k}$ are lost. The elements in a row of matrix $R_{(k-1)\times k}$ are cyclic shifted version of elements of other row, therefore the "k−1" file segments can be regenerated by obtaining the corresponding segments from the other "k−1" data storage nodes (6). Also file segments forming the column of matrix $D_{(n-k)\times k}$ correspond to file segments comprising a row of matrix $D_{k\times(n-k)}^T$, the remaining "n−k" file segments are regenerated by obtaining the corresponding file segments from all the "n−k" parity nodes (7).

The three phase approach to resolve the shortcomings of prior art has resulted in little degradation of storage efficiency which may be tolerable due to cheaper storage cost. The storage efficiency is the ratio of the total number of file segments to total number of storage segments used to store the file segments. Total number of storage segments is equal to the number of elements of the encoding matrix "M". The said statement can be represented in equation form for easy understanding:

$$\eta = \frac{B}{n(n-1)} = \frac{k(n-k+1)}{n(n-1)} = \frac{3k}{(k+1)(k+2)}$$

The effect of the approach resulted in optimal repair bandwidth gain obtained through theoretical studies available in prior art. The repair bandwidth gain is the ratio of the total number of file segments of a file to the number of file segments used to regenerate a failed node. Illustrated by the following equation for the ease of understanding:

$$\gamma = \frac{B}{\alpha} = \frac{k(n-k+1)}{(n-1)} = \frac{3k}{(k+1)}$$

The present invention also relates to a system (001) for regenerating a failed storage node (9) from one or more storage nodes (5) storing the original file. More particularly, the system (001) reconstructs the original file in a distributed storage system.

Figure 2:
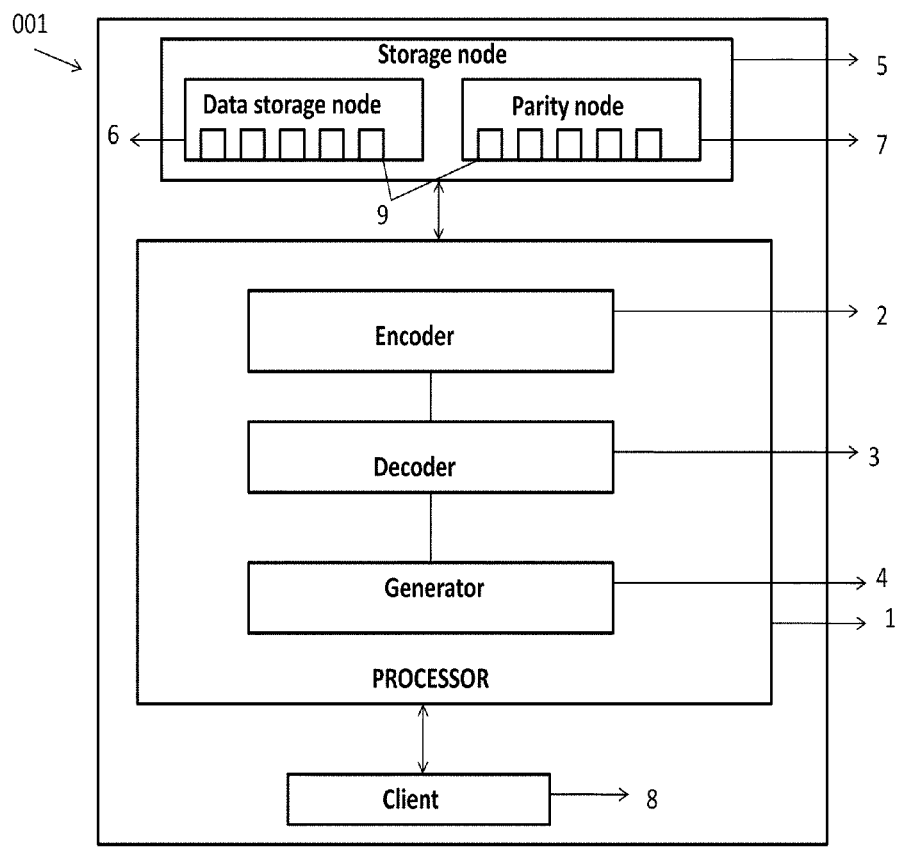
FIG. 2 illustrates the architecture of the system in accordance with an embodiment of the invention.

In accordance with an aspect, referring to FIG. 2, the system (001) comprises of a processor (1) configured to process the original file uploaded by a client (8) by splitting it into a plurality of file segment.

The processor (1) further comprises of an encoder (2), a decoder (3) and a generator (4). The encoder (2) is configured for encoding the file segments obtained after splitting the original file. The encoder (2) uses the XOR operation for encoding the file segments. The encoded file segments are further stored in the storage nodes (5). The encoded file segments are further processed through the decoder (3). The decoder (3) is configured to reconstruct the file segments from the encoded file segments. The file segments which are reconstructed are finally processed through a generator (4). The generator (4) is configured to regenerate the file segments stored in the failed storage node (9). The file segments are generated from the storage nodes (5) which are remaining and are in active position. The generator (4) further writes the file segments which are regenerated into a new storage node.

In accordance with an embodiment, the encoder (2) includes an EXR encoder (2) and the decoder (3) includes a maximum distance separable (MDS) decoder (3).

In accordance with an embodiment, the processor (1) also monitors the functioning of one or more storage node (5) to check if the said storage node (5) is working under a predetermined range.

BEST MODE/EXAMPLE FOR WORKING OF THE INVENTION

The process illustrated for Maximum Distance Separable (MDS) decoding in the above paragraph can be supported by a working example showed in the following paragraph, the process is not restricted to the said example only:

The number of data storage nodes "k" available are three, the total number of storage nodes "n" available on the distributed storage system are five. With these set of conditions the number of file segments "B" has a constant value of Nine; this value can be generated from the equation in which number of file segments "B" equals the product of number of data nodes "k" and the difference between the total number of nodes "n" available on distributed storage system and the data nodes "k" added with the constant One, "B=k(n−k+1)". With the above mentioned values of "n", "k" and "B", the encoding matrix "M" can be represented as follows:

$$M = \begin{bmatrix} x_1 & x_2 & x_3 & x_4 & x_7 \\ x_3 & x_1 & x_2 & x_5 & x_8 \\ x_4 & x_5 & x_6 & x_6 & x_9 \\ x_7 & x_8 & x_9 & s_1 & s_1 \end{bmatrix}$$

The columns in the encoding matrix "M" are indexed as $m_1$, $m_2$, $m_3$, $m_4$, and $m_5$. Each indexed column represents data to be stored on corresponding node in the distributed storage system. When the "B" file segments with a constant value of Nine is reconstructed from nodes $m_1$, $m_3$ and $m_5$. Node $m_5$ is acting as a parity node and the value of "t" is thus, One. The number of file segments obtained from the parity nodes "$N_P$" would be calculated as the product of number of parity nodes participating in reconstruction "t" and number of data nodes "k". The value calculated in our said example is three, which is represented by elements $x_7$, $x_8$ and $x_9$ of the encoding matrix "M" (indexed column $m_5$). The number of file segments obtained from "k" data nodes is represented by "$N_D$". The value for "$N_D$" is estimated as the product of, the value of the difference between total number of nodes "n", number of data nodes "k" and number of parity nodes participating in reconstruction "t", with, the difference between number of data nodes "k" and parity nodes in reconstruction "t" and this complete product added to the number of data nodes "k". "$N_D$" is represented in the equation form as follows:

$N_D = (n-k-t) \times (k-t) + k = 5 \rightarrow (x_1, x_2, x_3, x_4, x_6)$

The total number of file segments obtained "T" is derived from the summation of number of segments obtained from parity node(s) "$N_P$" and number of segments obtained from data nodes "$N_D$", which in our example is Eight. The eight elements $x_1$, $x_2$, $x_3$, $x_4$, $x_6$, $x_7$, $x_8$ and $x_9$ are from the encoding matrix "M".

$T = N_P + N_D = 8 \rightarrow (x_1, x_2, x_3, x_4, x_6, x_7, x_8, x_9)$

The remaining file segment $x_5$ will be obtained from XOR sum $s_1$.

ADVANTAGES OF THE INVENTION

The three phase process discussed is capable of storing the data in systematic format. This allows fast reconstruction of entire file when access to "k" data nodes is available and requires no computations to be carried out.

The proposed exact regeneration requires low processing, communication overheads, low field size and does not require updating relevant parameters (e.g. coding coefficients).

The regeneration of a failed node requires only copying the file segments from the remaining storage nodes, making the process very fast. This also reduces the probability of second node failure during the regeneration and thus increases the system reliability. Also, it is not necessary to have a processor for regeneration and only peripheral (like Direct Memory Access or DMA) can take care of the regeneration phase.

The invention supports partial recovery of the file in case access to less than "k" number of storage nodes is possible.

This is a definite advantage in case of image and video data as partial data can make some sense.

The invention can be extended to the case when the difference between total number of nodes "n" and number of data nodes "k" is greater than Two (n−k>2). The overall structure of the encoding remains same but the operations in higher field size are required instead of only XOR. However, the overall computational complexity still remains less than that in conventional systems.

The preceding description has been presented with reference to various embodiments of the invention. Persons skilled in the art and technology to which this invention pertains will appreciate that alterations and changes in the described process and methods of operation can be practiced without meaningfully departing from the principle, spirit and scope of this invention.

We claim:

1. A method for regenerating a failed storage node from a total number of storage nodes storing a file, the method comprising:
   splitting the file into a plurality of file segments using a formula, B=k (n−k+1), wherein B indicates the plurality of file segments, and wherein n indicates the total number of nodes, and wherein k indicates a plurality of data storage nodes of the total number of nodes (n), and wherein (n−k) indicates one or more parity nodes of the total number of storage nodes (n), and wherein the total number of storage nodes (n) are capable of storing the plurality of file segments (B);
   constructing an encoded matrix (M) using the plurality of file segments (B), wherein the encoded matrix (M) comprises (n−1) rows and n columns, wherein a column of the encoded matrix (M) represents one of a data storage node or a parity node, and wherein the encoded matrix (M) is, $$M = \begin{pmatrix} R_{(k-1) \times k} & D^T_{k \times (n-k)} \\ D_{(n-k) \times k} & S_{(n-k-1) \times (n-k)} \end{pmatrix}_{(n-1) \times n},$$

and wherein $R_{(k-1) \times k}$, $D_{(n-k) \times k}$ and $D^T_{k \times (n-k)}$ indicate sub-matrices comprising the plurality of file segments (B), and wherein $R_{(k-1) \times k}$ is a cyclic matrix, and wherein $S_{(n-k-1) \times (n-k)}$ indicates a parity matrix formed by performing an XOR operation on the plurality of file segments (B);
   distributing the plurality of file segments (B) on the total number of storage nodes (n) based on the matrix (M), such that each storage node of the total number of nodes (n) is configured to store (n−1) file segments; and
   regenerating at least one file segment stored on the failed storage node upon identifying the failed node, wherein at least one file segment is regenerated by using at least one other file segment based on the matrix (M), and wherein at least one other file segment corresponds to remaining nodes (n−1) of the total number of nodes (n), and wherein the regenerating at least one file segment from each of the remaining nodes (n−1) facilitates the regeneration of the failed storage node, and wherein the splitting, the encoding, the distributing and the regenerating are performed by a processor.

2. The method of claim 1, wherein the plurality of data storage nodes (k)>2 and is equal to (n−2).

3. The method of claim 1, wherein the one or more parity nodes (n−k) is 2.

4. The method of claim 1, wherein the failed storage node is at least one of the data storage node and the parity node.

5. The method of claim 1, wherein the $R_{(k-1) \times k}$ comprises one or more file segments of the plurality of file segments (B), wherein the one or more file segments are distributed in a cyclic manner.

6. The method of claim 5, wherein the $D_{(n-k) \times k}$ comprises file segments other than the one or more file segments.

7. The method of claim 1, wherein the $D^T_{k \times (n-k)}$ is a transpose matrix of the $D_{(n-k) \times k}$.

8. A system for regenerating a failed storage node from a total number of storage nodes storing a file, the system comprising:
- a processor; and
- a memory coupled to the processor, wherein the processor is capable of executing instructions stored in the memory, and wherein the instructions comprising:
  - splitting the file into a plurality of file segments using a formula, B=k (n−k+1), wherein B indicates the plurality of file segments, and wherein n indicates the total number of nodes, and wherein k indicates a plurality of data storage nodes of the total number of nodes (n), and wherein (n−k) indicates one or more parity nodes of the total number of storage nodes (n), and wherein the total number of storage nodes (n) are capable of storing the plurality of file segments (B);
  - constructing an encoded matrix (M) using the plurality of file segments (B), wherein the encoded matrix (M) comprises (n−1) rows and n columns, wherein a column of the encoded matrix (M) represents one of a data storage node or a parity node, and wherein the encoded matrix (M) is, $$M = \begin{pmatrix} R_{(k-1) \times k} & D^T_{k \times (n-k)} \\ D_{(n-k) \times k} & S_{(n-k-1) \times (n-k)} \end{pmatrix}_{(n-1) \times n},$$

and wherein $R_{(k-1) \times k}$, $D_{(n-k) \times k}$ and $D^T_{k \times (n-k)}$ indicate sub-matrices comprising the plurality of file segments (B), and wherein $R_{(k-1) \times k}$ is a cyclic matrix, and wherein $S_{(n-k-1) \times (n-k)}$ indicates a parity matrix formed by performing an XOR operation on the plurality of file segments (B);

- distributing the plurality of file segments (B) on the total number of storage nodes (n) based on the matrix (M), such that each storage node of the total number of nodes (n) is configured to store (n−1) file segments; and
- regenerating at least one file segment stored on the failed storage node upon identifying the failed node, wherein at least one file segment is regenerated by using at least one other file segment based on the matrix (M), and wherein at least one other file segment corresponds to remaining nodes (n−1) of the total number of nodes (n), and wherein the regenerating at least one file segment from each of the remaining nodes (n−1) facilitates the regeneration of the failed storage node.

* * * * *